Dec. 29, 1931. J. SCHMIDT 1,838,576
DOUGH MIXING AND MEASURING MACHINE
Filed Aug. 31, 1925 2 Sheets-Sheet 1

Dec. 29, 1931. J. SCHMIDT 1,838,576
DOUGH MIXING AND MEASURING MACHINE
Filed Aug. 31, 1925 2 Sheets-Sheet 2
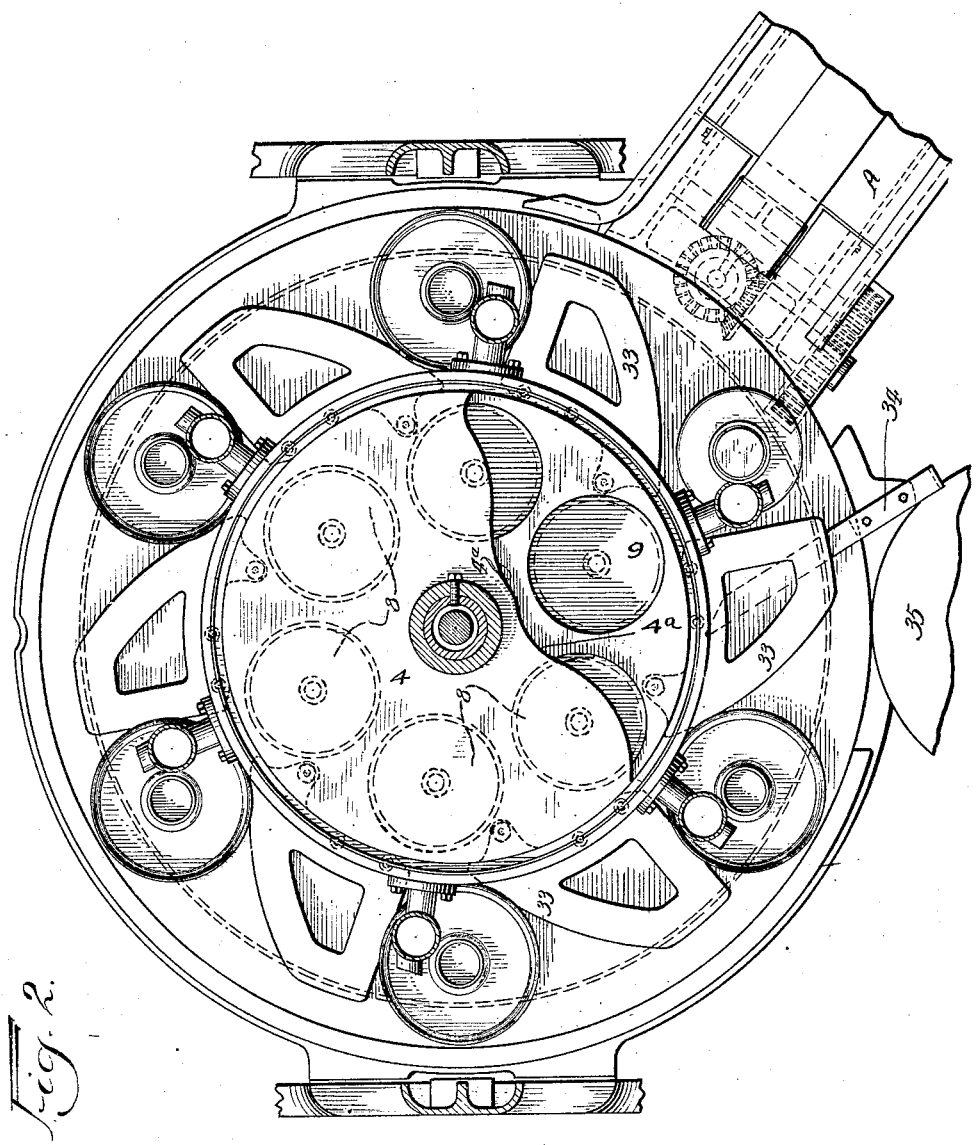

Patented Dec. 29, 1931

1,838,576

UNITED STATES PATENT OFFICE

JOHN SCHMIDT, OF HOOPESTON, ILLINOIS, ASSIGNOR TO SPRAGUE-SELLS CORPORATION, OF HOOPESTON, ILLINOIS

DOUGH MIXING AND MEASURING MACHINE

Application filed August 31, 1925. Serial No. 53,576.

This invention relates to an automatic machine for filling measured quantities of dough or like material into a series of containers as the containers are moved successively into operative relation with filling stations.

In the baking of cakes and like commodities on a commercial scale it is desirable that some highly efficient and rapid means be available to properly work, measure and place equal and uniform quantities of dough into each baking pan.

Where hand methods are resorted to for measuring or weighing the exact amount of dough required for each cake it becomes an arduous task for the employees and does not result in nearly as accurate a proposition as the commercial baker would like.

With cakes, whether sold by the pound or by the piece, it is the desire of the commercial baker that his product will run uniform as to size so that all of the product will be equally salable, and to attain this result on a commercial scale it is necessary that each charge of dough is very carefully handled and measured and that each is placed in the baking pan in like manner to the others to bring out a uniformly sized or weighed article so that each customer will be satisfied with any cake in the lot and there will be no selection as to size or quality.

In this invention I provide a dough measuring and filling machine that accurately and automatically stirs the mass of dough to maintain proper consistency; measures an exact quantity for each cake or other article being produced and so feeds the measured charge of dough into the baking pan that a perfect and uniform distribution is effected.

A succession of baking pans are automatically passed through a machine in operative relation with a dough feeding means so that each in turn will receive a measured charge of dough, each pan in succession is then discharged from the machine and is conveyed to the next stage in the process of baking.

It is therefore a principal object of this invention to provide a full automatic machine for measuring and feeding predetermined charges of dough to baking receptacles.

It is also an object of the invention to provide an apparaus having means for maintaining a mass supply of dough and means associated therewith for withdrawing measured charges from said mass and depositing said charges into suitable containers.

It is also an object of the invention to provide means for receiving and moving dough receptacles in single file processional arrangement into operative relation with feeding means whereby a measured charge of dough is delivered to each receptacle.

With such object in view as well as other advantages inherent in the invention, the novel structural peculiarities, novel organization of elements, and the separate and collective operations involved in carrying out my invention, which will be made the subject matter of claims hereto appended, I wish it understood that the several necessary elements and combinations constituting the same may be varied in their proportions, placements, general arrangement and operative relation without department and operative relation without departing from the scope and nature of my invention.

In carrying out the objects of my invention in a concrete form of apparatus, further objects, advantages and improvements have been evolved than have been recited, and in order to make the invention more clearly understood there are shown in the accompanying drawings, means and mechanism embodying the preferred disposition of the different parts and combinations, in which I have simply illustrated one way of embodying the creative part or concept of the invention in a concrete form of apparatus, and in so doing I do not wish to limit the claims to the exact detail of construction shown. The described devices are simply embodiments of the invention which other structures might also employ and some of the parts and combinations of parts may be used without the others in different types of such apparatus without departure from the purview of my invention and I regard myself as entitled to such variations from the shown and described devices as fall within the scope and meaning of the claims hereto appended.

In referring now to the drawings accompanying this application where a clearer and better understanding of the general arrangement and operation of the apparatus will be had, I want to point out that these drawings are more or less diagrammatic in character; are not necessarily drawn to scale, neither do they necessarily represent the best or the preferred engineering practices in connection with the construction of apparatus of this type, also that the proportions and relations of some of the parts may be more or less exaggerated in size and shape to better illustrate the application of the invention to an operative machine.

This invention is applied to a well known commercial filling machine known as the Merril-Soule-Filler, and in making the drawings to illustrate the application and working of my improvement I have shown only such part of the commercial filling machine as seemed necessary to give a clear understanding of the invention.

Figure 2 is a plan on approximately the line 2—2 of Figure 1, but showing the operative mechanism in an advanced position from that of Figure 1 for reasons that will be explained.

Figure 1:
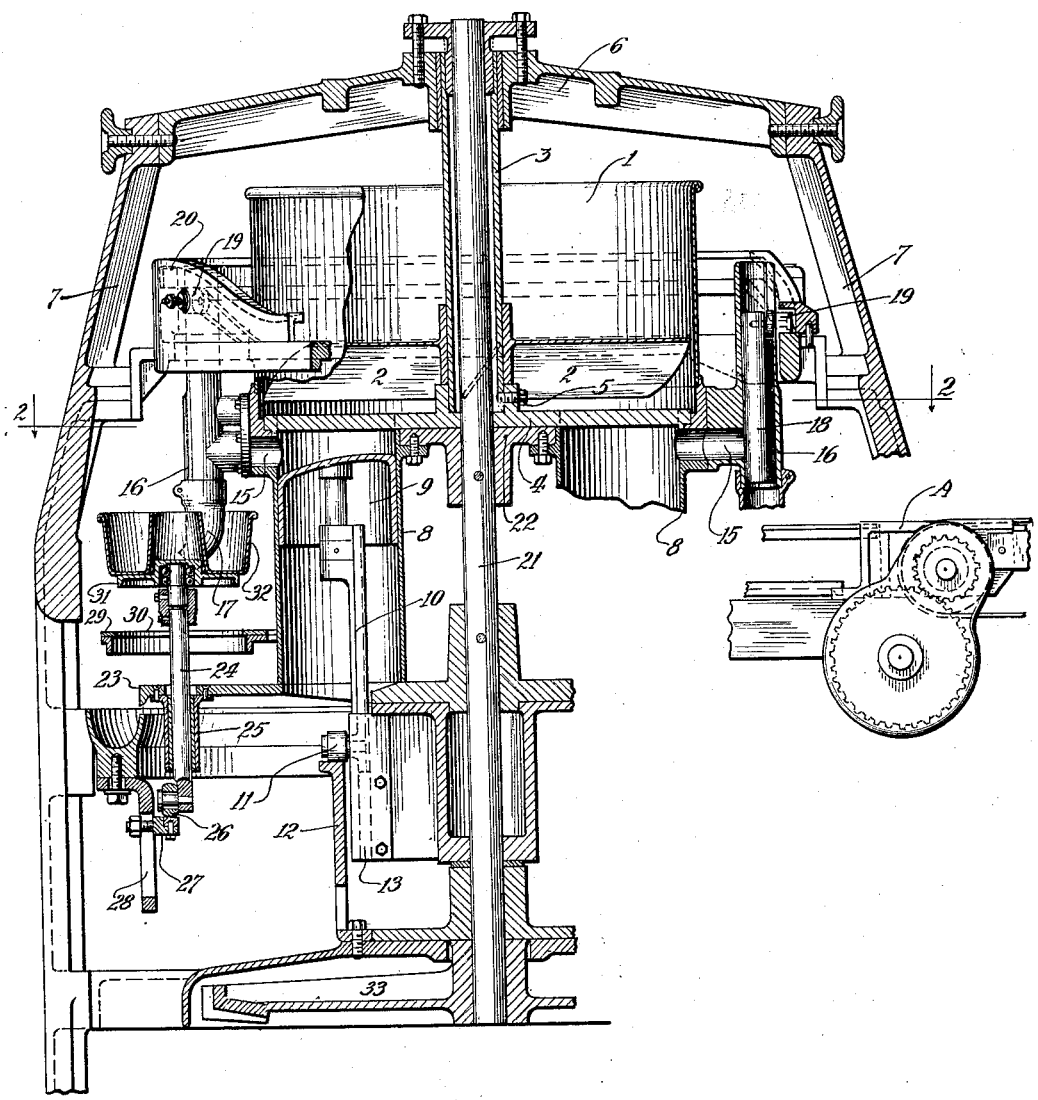
Figure 1 is a vertical sectional elevation of a part of a filling machine, with some parts in section on the plane of the section and other parts in full lines as it was thought that in this manner of illustration the mechanism would be clearer shown.

The general plan of structure of my improved dough feeding apparatus comprises a hopper in which a mass of dough is placed; agitating and mixing members moving in and through the mass of dough; a ported member opening and closing an outlet for charges of dough at regular intervals; a measuring cylinder and plunger for drawing a predetermined charge of dough from the mass in the hopper; a cut-off plunger working adjacent the measuring cylinder and plunger for actually measuring and determining the amount of dough fed to each baking pan; a distributing nozzle in operative relation to the cut off plunger; a rotatable support for the baking pans with means for supporting a series of baking pans in regular succession and moving them in operative relation with the feeding nozzle and with further means for removing the filled baking pans from the machine.

Referring now in more detail to the invention as embodied in the machine illustrated the numeral 1 indicates a supply hopper, 2 the agitating and mixing blades located near the bottom of the hopper and secured against rotation by being secured to the central stationary tube 3. 4 represents the cut-off disk secured against rotation by being secured to the lower end of the tube 3, by the screw 5. The upper end of the tube 3 being secured against rotation by passing through the top of the frame work and member 6 and being secured therein in the manner shown. 7 represents the main frame of the machine. Secured to the under side of the central rotary hopper 1 are measuring cylinders 8 in which are mounted plungers 9 operated by means of pitmen 10 carrying rollers 11 riding on the fixed cams 12. The pitmen 10 being guided by the slideways 13.

Figure 2 indicates that this particular machine has 6 cylinders arranged concentrically around the center of rotation and that the openings of the cylinders are successively brought into register with the cut-off opening 4a of the fixed cut-off plate 4. During the time the cylinders 8 are passing under this opening 4a the plungers 9 are drawn down by a continuation of the cam 12 not shown but which engages the tops of the rollers 11 which through the pitmen 10 draw a charge of dough from the supply tank 1 into the cylinder 8. The dough thus transferred to the cylinders 8 from the tank 1 is a predetermined measured charge and is just the right quantity for one cake or other article being baked at the time.

Connected near the tops of the cylinders 8 are ejector openings 15 extending laterally into vertically disposed discharge cylinders 16 ending in the specially shaped discharge nozzles 17. In the discharge cylinders 16 are cut-off plungers 18 having cam rollers 19 on their upper ends, riding in the fixed cam member 20. The function of the cut-off plungers 18 is to close the ejector openings 15 during the time the plungers 9 are drawing a charge of dough into the cylinders 8, to prevent the dough from running out of the nozzles 17 at the wrong time.

A vertical shaft 21 carries a spider 22 to which is secured the tops of the cylinders 8 in the manner shown. The shaft 21 also carries another spider 23 to which the lower ends of the cylinders 8 are secured. The spider 23 also carries on its outer periphery a series of vertically movable spindles 24 moving in suitable bearings 25 and carrying cam rollers 26 riding on the cam 27 which is adjustably carried by the supports 28. Just above the spider 23 is another spider 29 having openings 30 for admitting the ball bearing mounted pan supporting plates 31. In Fig. 1 the plate 30 is shown in an elevated position supporting a baking pan 32 in operative relation with a discharge nozzle 17.

The detached mechanism at the right of Fig. 1 represents a portion of a belt conveyor and operating parts for delivering empty pans to the spider 29 and deposit them on the plates 31. This is also shown in Fig. 2 and designated by the letter "A".

The members 33, Fig. 2, secured to the rotary part of the apparatus assist in aligning the pans centrally over the plates 31 while they are depressed below the spider 29 with the hubs on the tops of the plates substantially flush with the top of the spider 29.

The shaft 21 and parts secured thereto receive rotative movement through the gear 33 connected with driving mechanism not shown.

The operation of the invention would be substantially as follows when embodied in a machine as shown herein, but might differ somewhat when embodied in a machine of modified design and construction.

We will assume that the hopper has been supplied with a suitable dough for the purpose and a supply of baking pans placed in the machine and on the supporting plates. Power now being applied by any suitable means the hopper and attending parts will begin to rotate. Those cylinders moving under the open port in the bottom of the hopper will through the downward movement of the plungers receive a charge of dough and of course each succeeding cylinder as it passes under the ported bottom of the hopper will receive a like charge. After the charge of dough has been received by the cylinders 8 and the cylinders have moved away from the opening in the cut-off plate 4, the pans will have been elevated to the position shown in Fig. 1 into operative relation with the discharge nozzles 16, the plungers 18 in the cylinders 16 will be elevated to open the ports 15 and at the same time the plungers 9 in the cylinders 8 will begin to elevate and will force the charge of dough from the cylinders 8 through the port 15 past the elevated plungers 18 into the nozzles 16 from which the plastic mass will be projected into the bottom of the pans in a thin ribbon. The pan supporting plates 31 being mounted on ball bearings will rotate very freely so that as soon as the ribbon of dough engages the bottoms of the pans they will be rotated thereby and thus cause the ribbon of dough to lay uniformly in the bottom thereof and thus by continued discharge of the ribbon build up the dough in the pans to the desired thickness and quantity. The uniform downward movement of the plungers 16 will determine the exact quantity of dough going into each pan and as soon as the plungers 16 cut off the dough from the port 15 the flow will cease since there will be no more pressure applied to the remaining mass in the nozzles and the suction of the dough against the ends of the plungers will prevent its further movement. The baking pans will now be lowered away from the nozzles and the dough will break away at the ends of the nozzles. During the time the dough is being deposited in the pans and the thickness of dough is gradually building up the pans are gradually lowered by the proper shape of the cam 27 so that the relation of the ends of the nozzles and the surface of the dough is maintained practically constant. When the plates 31 have been lowered to the normal inoperative positions the pans with the charges of dough are swept off the spider 23 by means of the sweep arm 34 onto the discharge disk 35 and thereby conveyed away from the machine. It will be seen from the above description of the operation of the machine that it will result in very great economy as there is no chance of wasting dough in the operation of filling the pans and in measuring each charge. It will also be apparent from the manner in which the dough is deposited in the pans that there will be a very even distribution of the materials comprising the dough mixture since the dough is deposited in a relatively thin ribbon it results in a much finer texture of the cake and therefore a greatly improved product.

What I claim as new and desire to secure by Letters Patent is:

1. The method of depositing a mobile material into containers consisting in directing a stream of mobile material against the walls of a container to cause rotation thereof so the material is deposited in uniform layers that blend into a homogeneous mass and moving the container vertically while the material is being deposited therein.

2. A machine for measuring and feeding uniform charges of plastic material comprising a hopper adapted to contain a supply of material, a measuring device in operative relation therewith, means for admitting material from said hopper to said measuring device, a member for supporting a container and mounted for free rotation, means for imparting an upward movement to said support to position a container for filling, and to then impart a downward movement to the said container during the filling so the relation of the top surface of the material flowing into the container and the filling means remain substantially constant, means for conveying a measured charge of material to the container on said support and directing it tangentially to the walls thereof whereby the impact of the material causes the container to rotate according to the speed of the discharge to cause the material to deposit in uniform layers.

3. A machine for measuring and feeding uniform charges of a plastic material comprising a hopper adapted to contain a supply of material, measuring devices arranged in turret formation around said hopper, means for admitting material from said hopper in succession to said measuring devices, members for supporting containers and being mounted for free rotation, means for imparting an upward movement to said supporting members to position a container for filling, and to then impart a downward movement during the filling operation so the relation of the top surface of the material flowing into the container and the filling means remains substantially constant, means for conveying and directing measured charges of material into said containers by impinging the material tangentially to the walls of the containers so that the impact thereof will rotate the containers and their supports to cause the flowing material to deposit in uniform layers in said containers.

4. A machine for measuring and feeding a plastic material into positioned containers comprising a source of material supply, measuring and feeding devices adapted to connect with said supply to extract measured charges therefrom and feed them into said positioned containers, a support for each container mounted for both vertical and rotative movement during the filling thereof, means for imparting vertical movement away from the feeding device while material is flowing therefrom into a container and at the same time the impact of the material entering the container causing it to rotate to deposit the material in superposed uniform layers to make a homogeneous mass of uniform weight throughout the containers.

5. A machine for measuring and feeding a plastic material into positioned containers comprising a source of material supply, measuring and feeding devices adapted to connect with said supply to extract measured charges therefrom and feed said charges into positioned containers, a support for each container comprising a vertical spindle, a freely rotating head on said spindle, means for imparting vertical movement to said spindle to raise it into proper relation to said feeding device and to then lower said spindle and its positioned container while material is flowing into said container the impact of the material impinging onto the walls of the container causing it to rotate, and thereby producing a mass of superposed layers of material that blend into a homogeneous mass.

6. An apparatus for depositing cake dough into baking pans comprising a movable carrier member, a plurality of baking pan supports having freely rotating tops, a plurality of measuring and feeding devices arranged in operative relation with said baking pans when on said supports, means for moving a succession of baking pans onto and off said supports and means for giving said baking pans vertical movement while on said supports to cause them to recede from the said feeding devices while material is flowing therefrom into said pans and to be at the same time rotated by the impact of the material impinging against the walls of said pans and the deposited material whereby the issuing material is deposited in superposed layers and in uniform amounts in each pan.

7. The method of depositing a mobile material into containers consisting in directing a stream of material against the walls of a container to cause rotation thereof to cause the material to deposit in superposed layers and blend into a homogeneous mass and moving the container away from the issuing stream to give room for successive layers to build up in said container, to form said superposed layers.

8. An apparatus for depositing dough into baking pans comprising a movable carrier member, a plurality of baking pan supports on said member, each support having a freely rotating top, a plurality of measuring and feeding devices arranged in operative relation with baking pans on said supports, filling nozzles that are normally vertical with bent ejecting ports to direct issuing material tangentially to the bottom and walls of the baking pans to cause them to rotate on said supports, means for lowering the pans as material flows therein so the material is deposited in superposed layers and blends into a homogeneous mass and in uniform amounts in a succession of pans.

9. An apparatus for depositing dough into baking pans comprising a movable carrier member, a plurality of baking pan supports on said member and movable therewith, each support having a freely rotative top, a plurality of measuring devices, a plurality of feeding nozzles positioned eccentric to the center of rotation of said pan supports and having ejection ports for directing issuing material tangentially to the bottom and walls of said pans, the force of the ejecting material acting to rotate the said pans and deposit the ribbon of issuing material in superposed layers which blend into a homogeneous mass of uniform density and amount, with means for lowering the pans while the ribbon of material is flowing thereinto so the deposited material is always just below the ejector nozzle and the nozzle has no contact therewith.

10. An apparatus for depositing dough into baking pans comprising a rotatable carrier member, a plurality of pan supports on and moving with said carrier, each support having a freely rotatable top, a plurality of measuring devices, a plurality of feeding nozzles positioned eccentric to the center of rotation of said pan supports and having ejection ports bent from the vertical to deposit material tangentially to the walls of said pans and thereby act to rotate said pans on the said supports, means for lowering the pans as the material flows thereinto so that the superposed layers are aways below the said bent feeding nozzle and the uniform and even distribution of material is not disturbed by contacting with said nozzle as the layers build up into a homogeneous mass.

In testimony whereof I affix my signature.

JOHN SCHMIDT.